United States Patent
Parts et al.

(10) Patent No.: US 7,894,417 B2
(45) Date of Patent: Feb. 22, 2011

(54) SIGNAL ARRANGEMENT FOR MULTI-BANDWIDTH OFDM SYSTEM

(75) Inventors: Ülo Parts, Helsinki (FI); Kaj Jansen, Salo (FI)

(73) Assignee: Nokia Corporation, Espoo (FI)

(*) Notice: Subject to any disclaimer, the term of this patent is extended or adjusted under 35 U.S.C. 154(b) by 435 days.

(21) Appl. No.: 11/585,104

(22) Filed: Oct. 24, 2006

(65) Prior Publication Data

US 2007/0116094 A1    May 24, 2007

Related U.S. Application Data

(60) Provisional application No. 60/731,874, filed on Nov. 1, 2005.

(51) Int. Cl.
| | |
|---|---|
| *H04J 3/06* | (2006.01) |
| *H04J 3/00* | (2006.01) |
| *H04B 7/212* | (2006.01) |

(52) U.S. Cl. ............ 370/350; 370/345; 370/347; 370/503; 370/512

(58) Field of Classification Search ............ 370/347, 370/349, 350, 503, 512, 252, 324, 344, 345; 455/115.1, 115.3, 115.4, 69, 70, 434, 445–449, 455/452.2, 510, 522; 375/143, 149, 152
See application file for complete search history.

(56) References Cited

U.S. PATENT DOCUMENTS

| | | | | |
|---|---|---|---|---|
| 5,101,500 A | * | 3/1992 | Marui | 340/7.42 |
| 5,373,507 A | * | 12/1994 | Skold | 370/350 |
| 2004/0114551 A1 | * | 6/2004 | Gavillero et al. | 370/324 |
| 2007/0058595 A1 | * | 3/2007 | Classon et al. | 370/337 |

OTHER PUBLICATIONS

3GPP TSG RAN WG1 Ad Hoc on LTE (Sophia Antipolis, France, Jun. 20-21, 2005).*

NTT DoCoMo; "*Physical Channel Concept for Scalable Bandwidth in Evolved UTRA Downlink*"; 3GPP TSG RAN WG1 Ad Hoc on LTE, R1-050592, Jun. 20-21, 2005; pp. 1-14.

Ping Zhang; Xiaofeng Tao; Jianhua Zhang; Ying Wang; Lihua Li; Yong Wang: "*A Vision From The Future: Beyond 3G TDD*" Communications Magazine, IEEE, vol. 43, Iss.1, Jan. 2005 pp. 38-44.

3GPP TSG RAN WG1 #44 Meeting, "*EUTRA Cell Search for Initial Synchronization and Neighbor Cell Identification*", Feb. 13-17, 2006, R1-060289, pp. 1-8.

International Search Report PCT/IB2006/003034 filed Oct. 27, 2006.

(Continued)

*Primary Examiner*—Dwayne D Bost
*Assistant Examiner*—Larry Sternbane
(74) *Attorney, Agent, or Firm*—Squire, Sanders & Dempsey (US) LLP

(57) ABSTRACT

A pilot structure, a method, and a receiver for multi-carrier cellular communications communication system include a network element and a user equipment. The network element is configured to transmit a pilot sequence. The user equipment is configured to detect a pilot sequence comprising a primary synchronization sequence at predetermined number of sub-frames at a center of a bandwidth, a primary common pilot for each sub-frame, and short system information once per frame at the center of the bandwidth, and to decode the short system information to identify system frame timing and a system bandwidth of a cell.

22 Claims, 5 Drawing Sheets

OTHER PUBLICATIONS

R1-051147 Basic Structure of Control Channel and Synchronization Channel for Scalable Bandwidth in Evolved UTRA Downlink, NTT DoCoMo, Fujitsu, Mitsubishi Electric Corporation, NEC, Panasonic, SHARP, Toshiba Corporation, 3GPP TSG-RAN WG1 Meeting #42bis, Oct. 10-14, 2005, pp. 1-13.

R1-051057 Downlink Synchronization Channel Schemes for E-UTRA, Texas Instruments, 3GPP TSG-RAN WG1 Meeting #42bis, Oct. 10-14, 2005, pp. 1-12.

R1-051412 Cell Search Procedure for Initial Synchronization and Neighbour Cell Identification, Nokia, 3GPP TSG-RAN WGI Meeting #43, Nov. 7-11, 2005, pp. 1-6.

3GPP: "TR 25.814 vo.2.1: Technical Specification Group Radio Access Network; Physical Layer Aspects for Evolved UTRA (Release 7)", Aug. 1, 2005, pp. 1-35, XP002531474.

Application No./Patent No. 06809133.9—1525 / 1943796 PCT/ IB2006003034 ("European Search Report").

* cited by examiner

SIGNAL ARRANGEMENT FOR MULTI-BANDWIDTH OFDM SYSTEM

REFERENCE TO RELATED APPLICATIONS

This application claims priority of U.S. Provisional Patent Application Ser. No. 60/731,874, filed Nov. 1, 2005. The subject matter of this earlier filed application is hereby incorporated by reference.

BACKGROUND OF THE INVENTION

1. Field of the Invention

This invention relates to long term evolution of WCDMA (Wideband Code Division Multiple Access). In particular, the invention is related to defining a frame structure to efficiently search parameters in a multi-band Orthogonal Frequency Division Multiplexing (OFDM) system during initial synchronization.

2. Description of the Related Art

Wireless communication systems are widely deployed to provide various types of communication such as voice, packet data, and so on. These systems may be multiple-access systems capable of supporting communication with multiple users sequentially or simultaneously by sharing the available system resources. Examples of such multiple-access systems include Code Division Multiple Access (CDMA) systems, Time Division Multiple Access (TDMA) systems, and Orthogonal Frequency Division Multiple Access (OFDMA) systems, other types of multi-carrier access schemes, or any combinations of these.

Wireless communication systems divide areas of coverage into cells, each of which is served by a base station. A mobile station continuously monitors the signal strengths of a servicing base station for a current cell as well as for adjacent cells. The mobile station sends signal strength information to the network. As the mobile station moves toward the edge of the current cell, the servicing base station determines that the mobile terminal's signal strength is diminishing, while an adjacent base station will determine the signal strength is increasing. The two base stations coordinate with each other through the network, and when the signal strength of the adjacent base station surpasses that of the current base station, control of the communications is switched to the adjacent base station from the current base station. The switching of control from one base station to another is referred to as a handoff.

In the ever-continuing effort to increase data rates and capacity of wireless networks, communication technologies evolve. Multiple-input-multiple-output (MIMO) orthogonal frequency division multiplexing (OFDM) systems represent an encouraging solution for the next generation high-speed data downlink access. A benefit of such systems is their high spectral efficiency wherein all of the allocated spectrum can be used by all base stations. In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used. During initial synchronization, various systems and implementations are used that require operation in a variety of possible bandwidths. Also, the number of parameters that has to be searched during initial synchronization is large, thus, the frame structure has to be defined.

A special Short System Information (SSI) message present in every frame provides information pertaining to the wireless communication system, which is receivable by all terminals. Thus, the SSI has to be received by the terminals with good probability in all propagation and mobility conditions, in any reasonable cell deployment, and with any of the specified system bandwidths. In addition to frame synchronization, system bandwidth in a scalable bandwidth system (as Evolved Universal Terrestrial Radio Access Network (E-UTRA)), and the operation bandwidth is determined by receiving the SSI during the initial synchronization. In handover, the system bandwidth is given in the neighbor list, and decoding of the SSI is actually necessary mainly for frame timing detection. There is, therefore, a need in the art for a pilot structure and method that enables faster and more reliable finding of the system information message during the initial synchronization and during handover (preparation) in all propagation, mobility and interference conditions. The mobility conditions may include a receiver velocity up to 350 km/h.

Accordingly, an apparatus and method are needed to provide a signal structure that may enable a MS (mobile station) to synchronize and read messages from a BS (base station) without knowledge of the specific bandwidth (bandwidth). Contrary to conventional systems, the apparatus and method would not require numerous tests of numerous parameter combinations.

SUMMARY OF THE INVENTION

In accordance with an embodiment of the present invention, there is provided a method configuring a primary synchronization sequence every predetermined number of sub-frames of a frame at a center of a bandwidth, configuring a primary common pilot to be transmitted for each sub-frame. The primary synchronization sequence is configured at a different symbol of a sub-frame of the frame than the primary common pilot. The method also configures short system information to be transmitted once per frame at the center of the bandwidth. The method further transmits the frame comprising the primary synchronization sequence, the primary common pilot, and the short system information to identify system frame timing.

In accordance with an embodiment of the present invention, there is provided a method including detecting a pilot sequence that includes a primary synchronization sequence at predetermined number of sub-frames at a center of a bandwidth, a primary common pilot for each sub-frame, and short system information once per frame at the center of the bandwidth. The primary synchronization sequence is configured at a different symbol of a sub-frame than the primary common pilot, and decoding the short system information to identify system frame timing and a system bandwidth of a cell.

In accordance with an embodiment of the present invention, there is provided a computer program embodied on a computer readable medium, the computer program being configured to perform configuring a primary synchronization sequence every predetermined number of sub-frames of a frame at a center of a bandwidth, configuring a primary common pilot to be transmitted for each sub-frame. The primary synchronization sequence is configured at a different symbol of a sub-frame of the frame than the primary common pilot. The computer program further configures short system information to be transmitted once per frame at the center of the bandwidth. The computer program further transmits the frame comprising the primary synchronization sequence, the primary common pilot, and the short system information to identify system frame timing.

In accordance with an embodiment of the present invention, there is provided a computer program embodied on a computer readable medium, the computer program being configured to perform detecting a pilot sequence comprising a primary synchronization sequence at predetermined number of sub-frames at a center of a bandwidth, a primary common pilot for each sub-frame, and short system information once per frame at the center of the bandwidth, wherein the primary synchronization sequence is configured at a different symbol of a sub-frame than the primary common pilot. The computer program is also configured to decode the short system information to identify system frame timing and a system bandwidth of a cell.

In accordance with an embodiment of the present invention, there is provided a communication system including a network element and a user equipment. The network element is configured to transmit a pilot sequence. The user equipment is configured to detect a pilot sequence comprising a primary synchronization sequence at predetermined number of sub-frames at a center of a bandwidth, a primary common pilot for each sub-frame, and short system information once per frame at the center of the bandwidth, and to decode the short system information to identify system frame timing and a system bandwidth of a cell.

In accordance with an embodiment of the present invention, there is provided a communication system including network element means network element means for transmitting a pilot sequence, and user equipment means for detecting a pilot sequence comprising a primary synchronization sequence at predetermined number of sub-frames at a center of a bandwidth, a primary common pilot for each sub-frame, and short system information once per frame at the center of the bandwidth, and to decode the short system information to identify system frame timing and a system bandwidth of a cell.

In accordance with an embodiment of the present invention, there is provided a user equipment including a receiver configured to detect a pilot sequence comprising a primary synchronization sequence at predetermined number of sub-frames at a center of a bandwidth, a primary common pilot for each sub-frame, and short system information once per frame at the center of the bandwidth, and to decode the short system information to identify system frame timing and a system bandwidth of a cell.

In accordance with an embodiment of the present invention, there is provided a network element including a transmitter configured to transmit a primary synchronization sequence every predetermined number of sub-frames at a center of a bandwidth, to transmit a primary common pilot for each sub-frame, and to transmit short system information once per frame at the center of the bandwidth to identify system frame timing. The primary synchronization sequence is configured at a different symbol of a sub-frame than the primary common pilot.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

In accordance with an embodiment of the present invention, there is provided a frame structure, a method, and a receiver for multi-carrier cellular communications, which allow to efficiently search parameters in a multi-band Orthogonal frequency division multiplexing (OFDM) system during initial synchronization. The present invention defines a specific frame structure that enables a mobile station to perform a fast initial synchronization after power-up and read messages from a base station without knowing the exact bandwidth, which avoids multiple testing of various parameter combinations.

In one embodiment, the present invention relates to E-UTRA (Evolved Universal Mobile Telecommunications System Terrestrial Radio Access) systems, currently being evaluated and standardized for the long term evolution of Wideband Code Division Multiple Access (WCDMA) technology. The present invention has an impact on a frame structure and on a mobile receiver design, which improves reliability in a reception of system information message present in every frame and avoid extra payload, and, thus, allows faster and more reliable frame detection during initial synchronization and handover, as to more quickly acquire frame timing.

Figure 1:
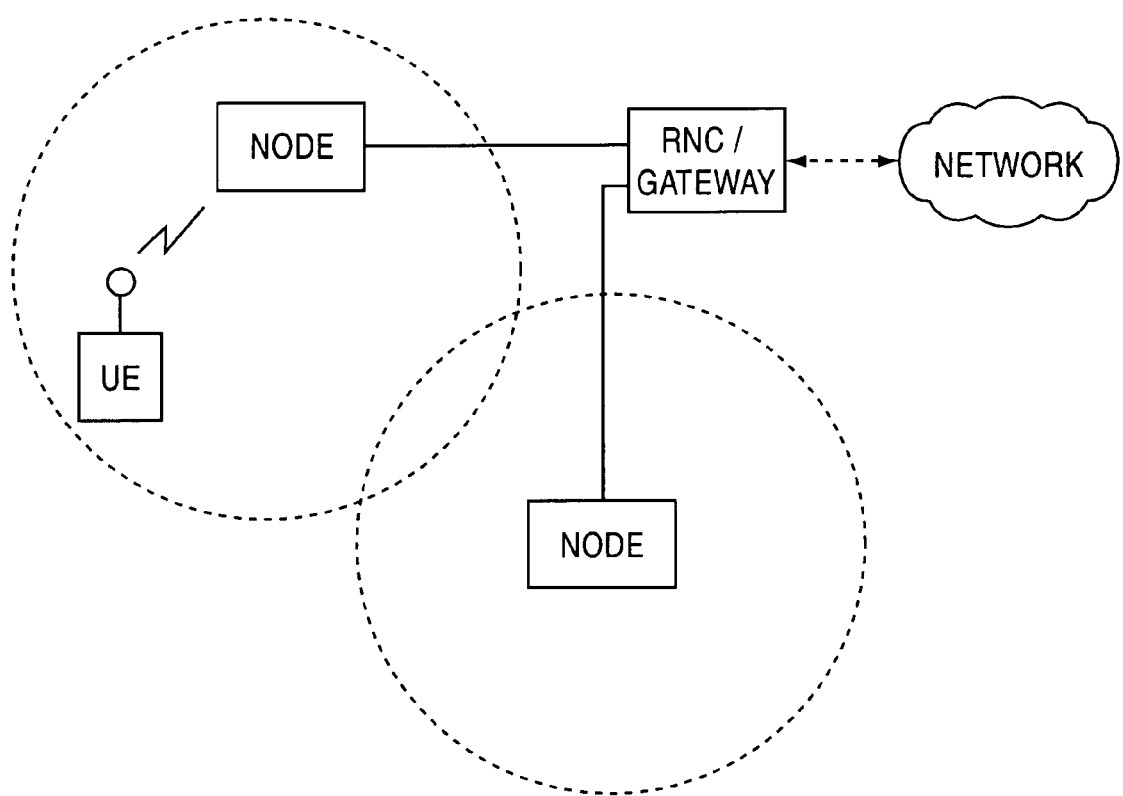
FIG. 1 illustrates an exemplary wireless network, in accordance with an embodiment of the present invention.

FIG. 1 illustrates an exemplary wireless network, in accordance with an embodiment of the present invention. As shown, a mobile station (MS) wirelessly communicates with a Node serving the communication needs of a geographic area (often referred to as a cell or collection of cells). The MS may be a mobile phone, wireless equipped PDA, wireless equipped laptop, etc. enabling communication with a telecommunications network system. The Node may bi-directionally communicate with the MS. The Node may be referred to as the access point, a base station, a base station controller, or base transceiver station in other communication standards, each including a form of transmitter. The Node may bi-directionally communicate with a radio network controller (RNC). The RNC routes, for example, data between Nodes or on to a receiver or network element in another communication network such as the internet. Although not illustrated, in one embodiment, the Nodes may be operatively connected to a gateway that is a router to the network. In the alternative, the RNC may be operatively connected to a mobile station controller and/or a gateway, which would be responsible for connections of the system to the network. It will be obvious to one skilled in the art that the communication network may include other functions and structures, which need not be described in closer detail herein.

OFDM modulation converts incoming serial data to parallel data in unit of a block, multiplexes the parallel symbols to orthogonal carrier frequencies, and thus transforms the broadband transmission to the narrowband transmission. The OFDM, one of multi-carrier modulation algorithms, shows high performance in multipath and mobile telecommunication networks, and enhances frequency utilization by use of a plurality of carriers.

A frame structure of an OFDM signal transmitted by a general OFDM system includes effective symbol duration and a guard interval (GI). The effective symbol duration carries data to be transmitted. The GI is used to reduce inter-symbol interference that is caused when a delayed symbol overlaps with a successive incoming symbol through the signal transmitting of the radio channel in the multipath channel environment. Additionally, the GI is used at an OFDM receiver to recover the symbol timing to prevent timing drift because of a symbol clock difference between the transmission and the reception.

During initial synchronization, a mobile station may find a signal from a neighboring base station, select the base station with the strongest received signal, and then perform symbol, sub-frame, and frame synchronizations. In multi-band OFDM systems, there are a significant number of parameters which must be searched during initial synchronization. In accordance with an embodiment of the present invention, a frame structure/signal structure is provided that enables the mobile station to synchronize and read messages from the base station without knowing the exact operating bandwidth, thereby reducing the need to perform tests using several parameter combinations.

Figure 2:
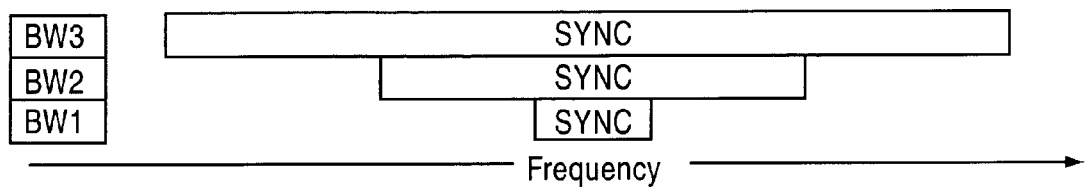
FIG. 2 generally illustrates a frame structure, in accordance with an embodiment of the present invention.
Figure 2:
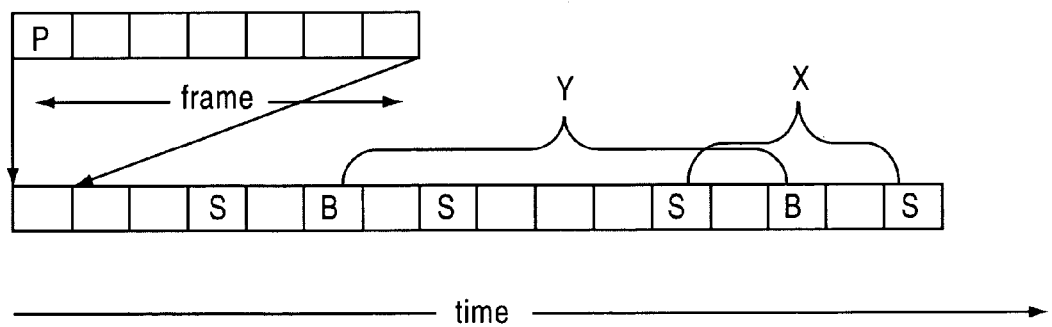

FIG. 2 generally illustrates a frame structure, in accordance with an embodiment of the present invention. SYNC corresponds to a signal in frequency domain. It is identical for every bandwidth. P corresponds to pilot symbol. S corresponds to sub-frame where SYNC signal is transmitted (one symbol and all sub-carriers for example in the end of frame). B corresponds to sub-frame (repetition Y) that carries broadcast messages.

Figure 3:
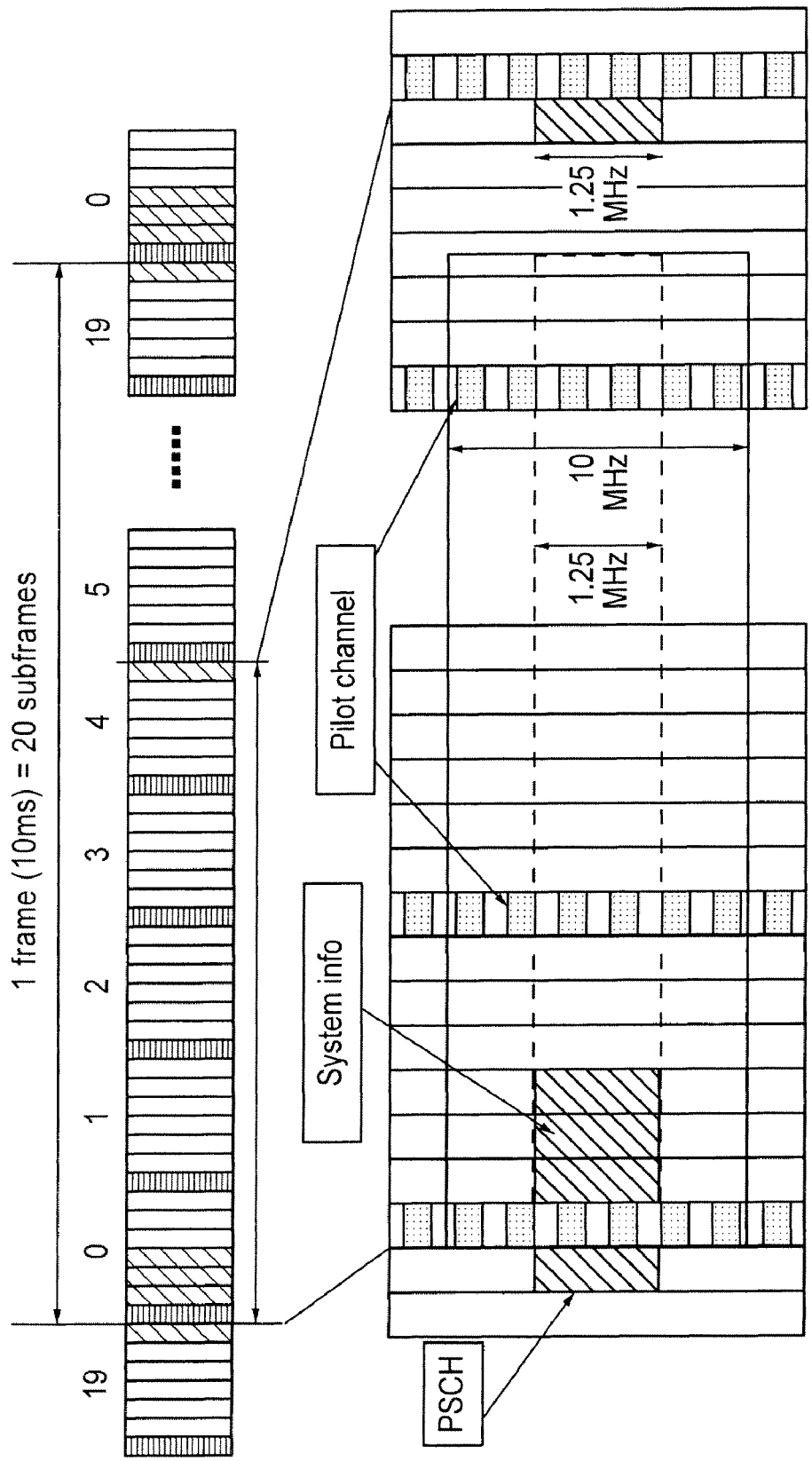
FIG. 3 illustrates an Evolved Universal Terrestrial Radio Access Network (E-UTRAN) frame, in accordance with an embodiment of the present invention.

FIG. 3 illustrates an Evolved Universal Terrestrial Radio Access Network (E-UTRAN) frame, in accordance with an embodiment of the present invention. Specifically, FIG. 3 illustrates a possible frame structure for initial synchronization in OFDM based downlink of Long Term Evolution (LTE), in accordance with an embodiment of the present invention. Time Division Multiplexer/Multiplexing (TDM) dedicated pilots are provided including a primary common pilot in at least one symbol of a sub-frame, once per frame, for transmission antennas, from where the system information message is transmitted. A 10 ms frame may include 20 sub-frames and seven symbols may form the sub-frame.

A synchronization signal for the time-slot synchronization may be transmitted via a P-SCH (Primary Synchronization Channel). A synchronization sequence, which is known in a receiver of a mobile station, may include a length of 256-chip codeword, and may be transmitted at a start of each time slot. In accordance with an embodiment of the present invention, in the frame structure may include the P-SCH for each bandwidth, which is placed at a center of the bandwidth. The P-SCH may be placed at a different symbol in the sub-frame/frame than a primary common pilot signal. For instance, the P-SCH may be placed at the end of the sub-frame and may be repeated every $X^{th}$ sub-frame. By detecting this P-SCH, the MS may find the timing of the primary common pilot signal and can identify a base station's specific primary common pilot sequence. The P-SCH may define symbol and sub-frame synchronization and it is, therefore, also indicative of a start phase of the primary common pilot sequence. The P-SCH may be transmitted four or five times in a frame. As illustrated in FIG. 3, P-SCH may be repeated in every $5^{th}$ sub-frame (X=5). Thus, symbol and sub-frame timing may be determined by detecting the P-SCH.

After pilot detection short system information (SSI) may be read. In accordance with an alternative embodiment of the present invention, a short system information message (SSI) may be provided in some known position of the frame with respect to a first detected P-SCH. The SSI may be transmitted once per frame, which would determine the frame timing. For instance, the SSI may use the first three symbols of a first sub-frame, once per frame, and be positioned at a center portion of the bandwidth. By using detected specific pilot, the MS is able to decode system information and read the actual system bandwidth and start using correct bandwidth. System information usually consists of several messages. Generally system information scheduling message is repeated most frequently to indicate where different system information messages can be found. Bandwidth information may be included in this scheduling message only if the MS needs it to decode the rest of the system information. Typically bandwidth information could be transmitted in the message carrying, for example, cell selection parameters which the MS has to read before accessing the system. This way overhead can be minimized.

Thus, the SSI may be transmitted once per frame, for instance, every 10 ms frame, but the P-SCH may be transmitted four or five times in a frame. After detection of the P-SCH, there may be four or five possible offsets for the SSI. Instead of trying reception of the SSI from maximum four or five places in a 10 ms window, a position of the SSI may be pre-checked by searching for a dual-sequence of a dedicated pilot sequence with a primary common pilot sequence. Thus, the pilot structure and method thereof allow a reduction of an amount of decoding trials and computation during initial synchronization and handover. The MS may find all cells of a network that have low enough propagation loss to the receiver by filtering a center-most sub-carriers around a tried carrier raster center-frequency and by match filtering a known system specific P-SCH code.

The SSI reception is required to be reliable at high mobile receiver velocities, for instance, up to 350 km/h. To support high velocities for system information message reception and for initial synchronization, the TDM dedicated pilots are needed to be present as a default setting for the sub-frame, where the SSI is present, because a network would not know velocity of a particular terminal trying to access the network.

After the MS receives strong enough regular P-SCH signals, the MS can determine from a highest match filter peaks with a constant time difference, which base station (or access point or network element or a base station controller) the strongest candidates. The peaks also reveal the periodicity of the common pilot sequences, which can be used for synchronization and channel estimation. It is important to know this periodicity, so that a trial procedure may efficiently find the correct PCP sequence in use in the target candidate access point, among the full set of sequences available in the network.

When the periodicity of the pilot sequence is known from the P-SCH peaks, it is possible to find the pilot sequence of that access point by trying cross-correlations of the received sequence and all of the a-priori known access point sequences (e.g., 128 pilot sequences). Even if the operating bandwidth is larger than 1.25 MHz, a search of the code sequence happens by the middle frequency-part of the sequence only. If a velocity of the receiver is high, test sequences may be cross-correlated to the received signal in short periods, shorter than the coherence time and averaged non-coherently over much longer time to form a reliable cross-correlation result. If the velocity of the receiver is slower, the coherent averaging time could be longer. However, the receiver is not expected to know its velocity, and, thus, a worst case averaging may be applied.

Once a pilot sequence out of all defined pilot sequences (i.e., approximately 128 pilot sequences) is reliably detected, a receiver in the MS starts to find the 10 ms frame timing and system bandwidth. The SSI may reveal frame timing uniquely. In order to determine frame timing, the SSI may be a self-decodable channel coding block with an error detection code, which appears once in every 10 ms frame. After the receiver has found the SSI and has successfully decoded it, the frame timing is guaranteed. The information contents of the SSI may also identify the system bandwidth of that cell. Accordingly, the receiver would have all the required knowledge to receive and decode signals from that cell.

The P-SCH would include enough samples for cross-correlating the received signal and a known system specific sequence, thus, the P-SCH is modulated to every sub-carrier on the 1.25 MHz band (e.g., 74 sub-carriers omitting a DC sub-carrier in recent E-UTRA parametrization). The synchronization and cell search requirements are actually very tight. The receiver may be able to reliably find cells in reasonably short time, even if the signal to interference ratios are very low, for instance, −7 dB to −10 dB, and even if the velocity of the receiver is very high, for instance, up to 350 km/h.

Figure 4:
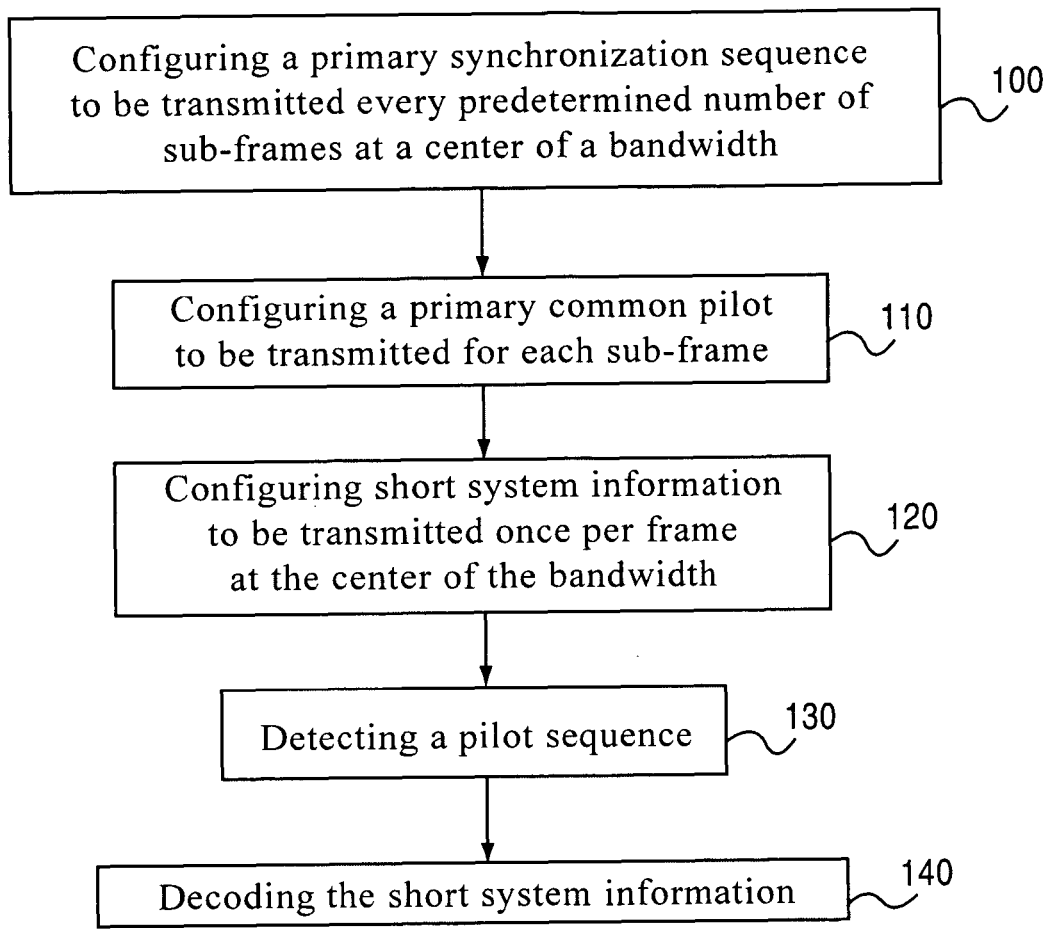
FIG. 4 illustrates a method performed by a combination of a network element and a receiver of a mobile station, in accordance with an embodiment of the present invention.

FIG. 4 illustrates a method performed by a combination of a network element, which may include a base station, and a receiver of a mobile station, in accordance with an embodiment of the present invention. At step 100, the method configures a primary synchronization sequence to be transmitted every predetermined number of sub-frames at a center of a bandwidth. At operation 110, the method configures a primary common pilot to be transmitted for each sub-frame. The primary synchronization sequence is configured at a different symbol of a sub-frame than the primary common pilot. At operation 120, the method configures the short system information to be transmitted once per frame at the center of the bandwidth. A person of ordinary skill in the art will appreciate that steps 100 to 120 may be performed by the network element.

At operation 130, the method detects a pilot sequence at the receiver including a primary synchronization sequence at predetermined number of sub-frames at the center of the bandwidth, the primary common pilot for each sub-frame, and the short system information once per frame at the center of the bandwidth. At operation 140, the method decodes the short system information and reading a frame number to identify system frame timing and a system bandwidth of a cell. A person of ordinary skill in the art will appreciate that steps 130 to 140 may be performed by the receiver.

Figure 5:
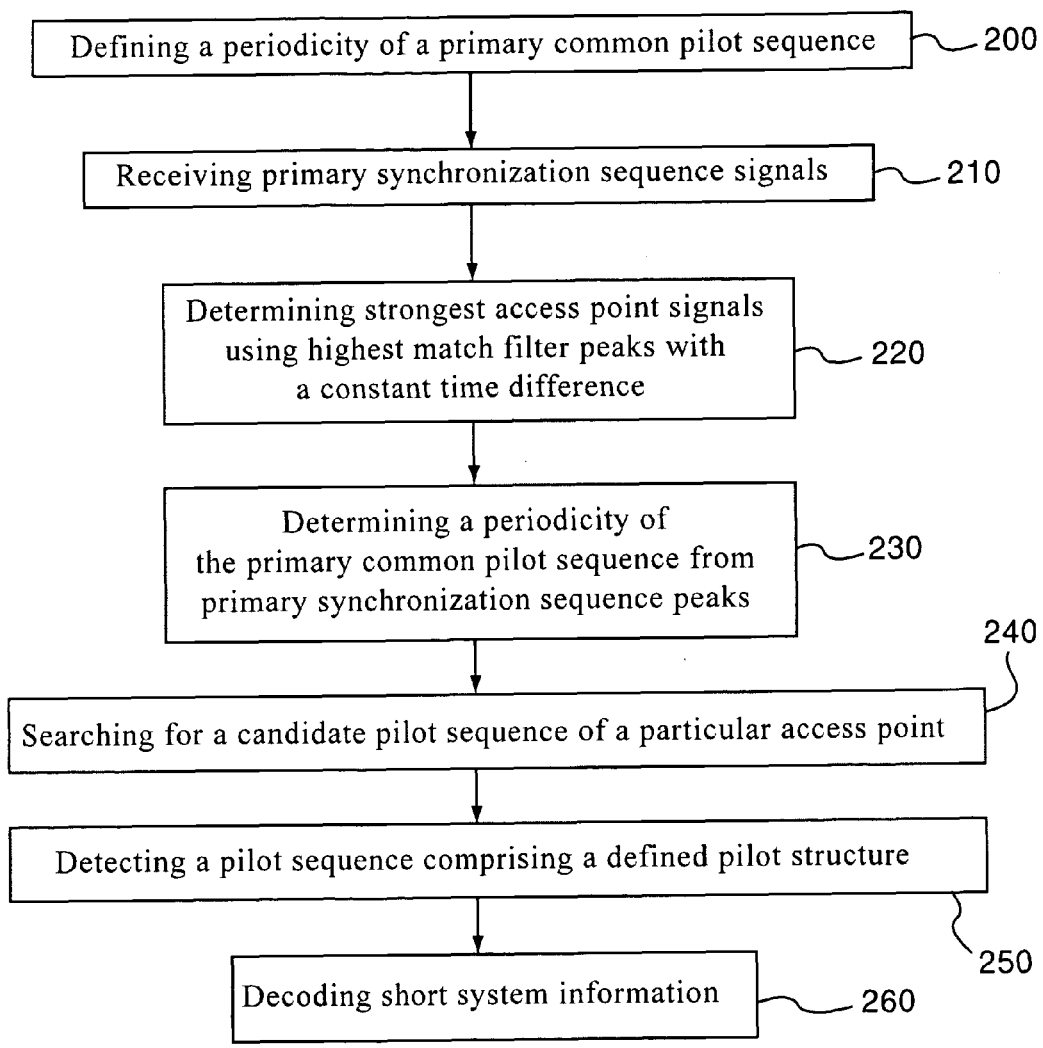
FIG. 5 illustrates a method performed by a receiver in the MS, in accordance with an embodiment of the present invention.

FIG. 5 illustrates a method performed by a receiver in the MS, in accordance with an embodiment of the present invention. At step 200, the method configures the highest match filter peaks to define a periodicity of a primary common pilot sequence to be used for synchronization and channel estimation. At step 210, the method receives primary synchronization sequence signals. At step 220, the method determines the strongest access point signals using highest match filter peaks with a constant time difference. At step 230, the method determines a periodicity of the primary common pilot sequence from the primary synchronization sequence peaks. At step 240, the method searches for a candidate pilot sequence of a particular access point by cross-correlating the received pilot sequence with known pilot sequences associated with all access points.

At step 250, the method detects a pilot sequence including the defined pilot structure including a primary synchronization sequence at predetermined number of sub-frames at a center of a bandwidth, a primary common pilot for each sub-frame, and short system information once per frame at the center of the bandwidth. The primary synchronization sequence may be configured at a different symbol of a sub-frame than the primary common pilot. At step 260, the method decodes the short system information to identify frame timing and a system bandwidth of a cell.

As shown above, implementations of the invention can, in certain circumstances, enable the initial synchronization procedure to be the same for all bandwidths. This therefore results in a simplified specification for the synchronization procedure. Furthermore, though there may be a plurality of mobile stations having various capabilities, embodiments of the invention enable a plurality of mobile stations to synchronize to a particular network, and read system information. Additionally, the proposed structure utilizes such parameters as pilot sequences, system information, etc., which are helpful for providing good performance. The proposed structure, therefore, avoids additional payload being required for the synchronization. Additionally, frame timing can be determined using a system information block. In some implementations, processing using a narrowest bandwidth can require more time averaging. However, bandwidth and parameter selection can be optimized for particular applications.

In other words, system information present in every frame can determine the frame synchronization during initial synchronization. Additionally, bandwidth information is also available from that message. This is one of the features that enable initial synchronization without knowing the particular bandwidth utilized in a multi-bandwidth OFDM system.

Many advantages are provided by the pilot structure, method, and receiver of the present invention. For instance, a more reliable frame detection and Short System Information reception for high velocity terminals is provided. Also, less trials and less processing in finding system information block position during initial synchronization is required. The implementation of soft-combining for decoding of the Short System Information of the present invention is less complex and enables decrease of pilot overhead.

It is to be understood that in the embodiment of the present invention, the operations are performed in the sequence and manner as shown although the order of some operations and the like may be changed without departing from the spirit and scope of the present invention.

The steps of the methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

With respect to the present invention, network devices may be any device that utilizes network data, and can include switches, routers, bridges, gateways or servers. In addition, while the terms frame and signals have been used in the description of the present invention, the invention has import to many types of network data. For purposes of this invention, the term data includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. A method, comprising:
configuring, by a processor, a primary synchronization sequence every fourth or fifth sub-frame of a frame at a center of a bandwidth;
configuring, by the processor, a primary common pilot to be transmitted for each sub-frame, wherein the primary synchronization sequence is configured at a different symbol of a sub-frame of the frame than the primary common pilot;
configuring, by the processor, short system information to be transmitted once per frame at the center of the bandwidth, the short system information providing information pertaining to a wireless communication system, including a system bandwidth; and
transmitting, by the processor, the frame comprising the primary synchronization sequence, the primary common pilot, and the short system information.

2. The method as recited in claim 1, wherein a structure of the frame period comprises definitions of at least one of sub-frames, signaling channels, and pilot positions.

3. The method as recited in claim 1, further comprising:
defining the primary common pilot to be present in a first symbol of every sub-frame.

4. The method as recited in claim 1, further comprising:
configuring the short system information to be transmitted using a predetermined number of symbols of a sub-frame.

5. A method, comprising:
detecting, by a processor, a pilot sequence comprising a primary synchronization sequence at every fourth or fifth sub-frame of a frame at a center of a bandwidth, a primary common pilot for each sub-frame, and short system information once per frame at the center of the bandwidth, the short system information providing information pertaining to a wireless communication system, including a system bandwidth,
wherein the primary synchronization sequence is configured at a different symbol of a sub-frame than the primary common pilot; and
decoding, by the processor, the short system information to identify a system bandwidth of a cell.

6. The method as recited in claim 5, further comprising:
adjusting a receiver bandwidth according to the decoded bandwidth of the cell.

7. The method as recited in claim 5, further comprising:
decoding the short system information and reading a frame number to further identify system frame timing 8. The method as recited in claim 5, further comprising:
based on an identified access point, performing symbol, sub-frame, and frame synchronization and correcting frequency offset.

9. A computer program embodied on a non-transitory computer readable medium, the computer program being configured to perform:
configuring a primary synchronization sequence every fourth or fifth sub-frame of a frame at a center of a bandwidth;
configuring a primary common pilot to be transmitted for each sub-frame, wherein the primary synchronization sequence is configured at a different symbol of a sub-frame of the frame than the primary common pilot;
configuring short system information to be transmitted once per frame at the center of the bandwidth, the short system information providing information pertaining to a wireless communication system, including a system bandwidth; and
transmitting the frame comprising the primary synchronization sequence, the primary common pilot, and the short system information.

10. A computer program embodied on a non-transitory computer readable medium, the computer program being configured to perform:
detecting a pilot sequence comprising a primary synchronization sequence at every fourth or fifth sub-frame of a frame at a center of a bandwidth, a primary common pilot for each sub-frame, and short system information once per frame at the center of the bandwidth, the short system information providing information pertaining to a wireless communication system, including a system bandwidth,
wherein the primary synchronization sequence is configured at a different symbol of a sub-frame than the primary common pilot; and
decoding the short system information to identify a system bandwidth of a cell.

11. A system, comprising:
a network element configured to transmit a pilot sequence; and
a user equipment configured to detect a pilot sequence comprising a primary synchronization sequence at every fourth or fifth sub-frame of a frame at a center of a bandwidth, a primary common pilot for each sub-frame, and short system information once per frame at the center of the bandwidth, and to decode the short system information to identify a system bandwidth of a cell,
the short system information providing information pertaining to a wireless communication system, including a system bandwidth.

12. The system as recited in claim 11, wherein the primary synchronization sequence is configured at a different symbol of a sub-frame than the primary common pilot.

13. A system, comprising:
network element means for transmitting a pilot sequence; and
user equipment means for detecting a pilot sequence comprising a primary synchronization sequence at every fourth or fifth sub-frame of a frame at a center of a bandwidth, a primary common pilot for each sub-frame, and short system information once per frame at the center of the bandwidth, and to decode the short system information to identify a system bandwidth of a cell, wherein the short system information provides information pertaining to a wireless communication system, including a system bandwidth.

14. An apparatus, comprising:
a processor; and
a memory including a computer program code, wherein the memory and the computer program code are configured, with the processor, to cause the apparatus, at least, to detect a pilot sequence comprising a primary synchronization sequence at every fourth or fifth sub-frame of a frame at a center of a bandwidth, a primary common pilot for each sub-frame, and short system information once per frame at the center of the bandwidth, and decode the short system information to identify a system bandwidth of a cell, wherein the short system information provides information pertaining to a wireless communication system, including a system bandwidth.

15. The apparatus as recited in claim 14, wherein the apparatus adjusts a receiver bandwidth according to the decoded bandwidth of the cell.

16. The apparatus as recited in claim 14, wherein the apparatus decodes the short system information and reads a frame number to further identify system frame timing 17. The apparatus as recited in claim 14, wherein, based on an identified access point, the apparatus performs symbol, sub-frame, and frame synchronization and correcting frequency offset.

18. An apparatus, comprising:

a processor; and a memory including a computer program code, wherein the memory and the computer program code are configured, with the processor, to cause the apparatus, at least, to transmit a primary synchronization sequence every fourth or fifth sub-frame of a frame at a center of a bandwidth, transmit a primary common pilot for each sub-frame, and transmit short system information once per frame at the center of the bandwidth, the short system information providing information pertaining to a wireless communication system, including a system bandwidth, wherein the primary synchronization sequence is configured at a different symbol of a sub-frame than the primary common pilot.

19. The apparatus as recited in claim 18, wherein a structure of the frame period comprises definitions of at least one of sub-frames, signaling channels, and pilot positions.

20. The apparatus as recited in claim 18, wherein the primary common pilot is configured to be present in a first symbol of every sub-frame.

21. The apparatus as recited in claim 18, wherein the apparatus transmits the short system information once per frame to define frame timing 22. The apparatus as recited in claim 18, wherein the apparatus transmits the short system information using a predetermined number of symbols of a sub-frame.

* * * * *